US008456723B2

(12) United States Patent
Shirai

(10) Patent No.: US 8,456,723 B2
(45) Date of Patent: Jun. 4, 2013

(54) OPTICAL BOX, OPTICAL SCANNER, AND IMAGE FORMING APPARATUS

(75) Inventor: Nobuhiro Shirai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 12/548,215

(22) Filed: Aug. 26, 2009

(65) Prior Publication Data

US 2010/0053714 A1 Mar. 4, 2010

(30) Foreign Application Priority Data

Aug. 28, 2008 (JP) ................................ 2008-219570

(51) Int. Cl.
*G02B 26/08* (2006.01)
*G02B 26/10* (2006.01)
*G02B 26/12* (2006.01)

(52) U.S. Cl.
USPC .................................... 359/197.1; 359/226.1

(58) Field of Classification Search
USPC ........................................... 359/196.1–226.3
See application file for complete search history.

(56) References Cited

U.S. PATENT DOCUMENTS

2004/0246553 A1* 12/2004 Yoshizawa .................... 359/216
2007/0053040 A1* 3/2007 Sakaue et al. ................. 359/204
2007/0149030 A1* 6/2007 Kanamaru et al. ............ 439/352

FOREIGN PATENT DOCUMENTS

JP 6-273682 A 9/1994
JP 7-68836 A 3/1995
JP 9-191529 A 7/1997
JP 10-51931 A 2/1998
JP 2000-258712 A 9/2000
JP 2005-202169 A 7/2005
JP 2006-150687 A 6/2006

* cited by examiner

*Primary Examiner* — Alessandro Amari
*Assistant Examiner* — Kimberly N Kakalec
(74) *Attorney, Agent, or Firm* — Birch, Stewart, Kolasch & Birch, LLP

(57) ABSTRACT

An optical box for an optical scanner includes an optical housing and a lid. The optical housing has an opening and a side wall surrounding the opening. The side wall includes inward recessed parts, each of which has a protrusion formed on its outer side. The protrusion can engage with the lid. The lid can so engage with the optical housing as to cover the opening of the housing. The lid has a pair of dust guard walls, between which the whole side wall of the optical housing is sandwiched when the lid is in engagement with the housing.

4 Claims, 6 Drawing Sheets

OPTICAL BOX, OPTICAL SCANNER, AND IMAGE FORMING APPARATUS

CROSS REFERENCE

This Nonprovisional application claims priority under 35 U.S.C. §119(a) on Patent Application No. 2008-219570 filed in Japan on Aug. 28, 2008, the entire contents of which are hereby incorporated by reference.

BACKGROUND OF THE INVENTION

1. Field of the Invention

The present invention relates to an optical box as a plastic molding which can be mounted in and removed from an image forming apparatus. The optical box holds optical parts in it. The invention also relates to an optical scanner including such an optical box. The invention further relates to an image forming apparatus including such a scanner.

2. Description of the Related Art

An optical box as a plastic molding for an optical scanner or the like needs to be sufficiently dust-proof because the box holds optical parts in it. Conventionally, optical boxes, each of which includes an optical housing and a lid, have been so devised in various forms as to prevent dust from entering the box through the gaps between the housing and the lid.

The prior art includes JP-2000-258712-A, which discloses an optical scanner including an optical box. This optical box includes an optical housing and a lid as a plastic molding shaped for the open side of the housing. The lid is screwed firmly to the housing so as to prevent dust from entering the optical box. When the lid is screwed to the housing, resin swarfs are produced, which may unfavorably affect the functions of the collimator lenses and other optical parts of the scanner.

Attempts have been made to engage a lid with an optical housing without using screws. However, it has been difficult to design a sufficiently dust-proof optical box as a plastic molding which is easy to make.

In recent years, for unit maintenance and unit disposal, it has been important to guarantee easy mounting of an optical box in an image forming apparatus and easy removal of the box from the apparatus.

One object of the present invention is to provide a dust-proof optical box which is easy to manufacture, mount in an image forming apparatus, and remove from the apparatus. Another object is to provide an optical scanner including such an optical box. Still another object is to provide an image forming apparatus including such a scanner.

SUMMARY OF THE INVENTION

An optical box according to the present invention is a plastic molding for holding one or more optical parts in it. The optical box can be mounted in and removed from an image forming apparatus. The optical box includes a first housing member and a second housing member. One of the two housing members may be an optical housing, and the other may be a lid. Each of the housing members may hold one or more optical parts in it.

The first housing member has an open side and a wall surrounding the open side. The wall includes first inward recessed parts, each of which has a first engaging part formed on its outer side. The first engaging part can engage with the second housing member. The first engaging part may be a protrusion protruding outward from the associated first inward recessed part.

The second housing member can so engage with the first housing member as to cover the open side of the first housing member. The second housing member has an inner dust guard wall and an outer dust guard wall, between which the whole wall of the first housing member is sandwiched when the two housing members are in engagement with each other. The dust guard walls prevent dust from entering the optical box through the gaps between the housing members. The dust guard walls may be a pair of walls defining a groove between them for engaging with the wall of the first housing member. It is preferable that the groove be deep enough for the dust guard walls to overlap sufficiently with the wall of the first housing member. The inner dust guard wall includes second inward recessed parts each for engaging with one of the first inward recessed parts. The outer dust guard wall includes third inward recessed parts each for engaging with one of the first inward recessed parts. The outer dust guard wall has second engaging parts each formed outside one of the third inward recessed parts. Each of the second engaging parts can engage with the associated first engaging part. Each of the second engaging parts may be a claw having a hole formed through it for engaging with the associated first engaging part.

When the two housing members are in engagement with each other, the whole wall of the first housing member is sandwiched securely between the dust guard walls. This makes dust less liable to enter the optical box through the gaps between the housing members.

Each of the first engaging parts, which can engage with the second housing member, is formed on the associated first inward recessed part of the wall of the first housing member. This makes the second engaging parts less liable to protrude from the outer surfaces of the optical box. As a result, the optical box is easy to mount in and remove from an image forming apparatus or another apparatus.

The formation of each of the first engaging parts on the associated first inward recessed part makes it possible to form a space between each of the second engaging parts and the outer dust guard wall. As a result, the second engaging parts are easy to form by means of a simple vertical cutting die.

It is preferable that the second engaging parts should not protrude outward from the wall of the first housing member when the two housing members are in engagement with each other. If the second engaging parts do not protrude from the wall of the first housing member, they are less liable to come into contact with other parts of an image forming apparatus when the optical box is mounted in and removed from the apparatus. This makes the optical box easier to mount in and remove from the apparatus. In addition, this prevents the second engaging parts from being broken by external force.

It is also preferable that the outer sides of the second engaging parts be flush with the outer surface of the wall of the first housing member when the two housing members are in engagement with each other. If the outer sides of the second engaging parts are flush with the outer surface of the wall of the first housing member, the outer surfaces of the optical box are less liable to catch other parts of an image forming apparatus when the box is mounted in and removed from the apparatus.

The second engaging parts may be positioned relative to the wall of the first housing member by suitably adjusting the depth of the first inward recessed parts of this wall, adjusting the size of the first engaging parts on these recessed parts, or positioning the second engaging parts inward.

The optical box can be applied to the optical scanner of an apparatus for electrophotographic image formation. Heat is liable to be generated in the optical box of an optical scanner. Even if a large amount of heat is generated in the optical box according to the present invention, the whole box easily absorbs thermal strain because the two housing members are not screwed firmly together.

DETAILED DESCRIPTION OF THE INVENTION

Figure 1:
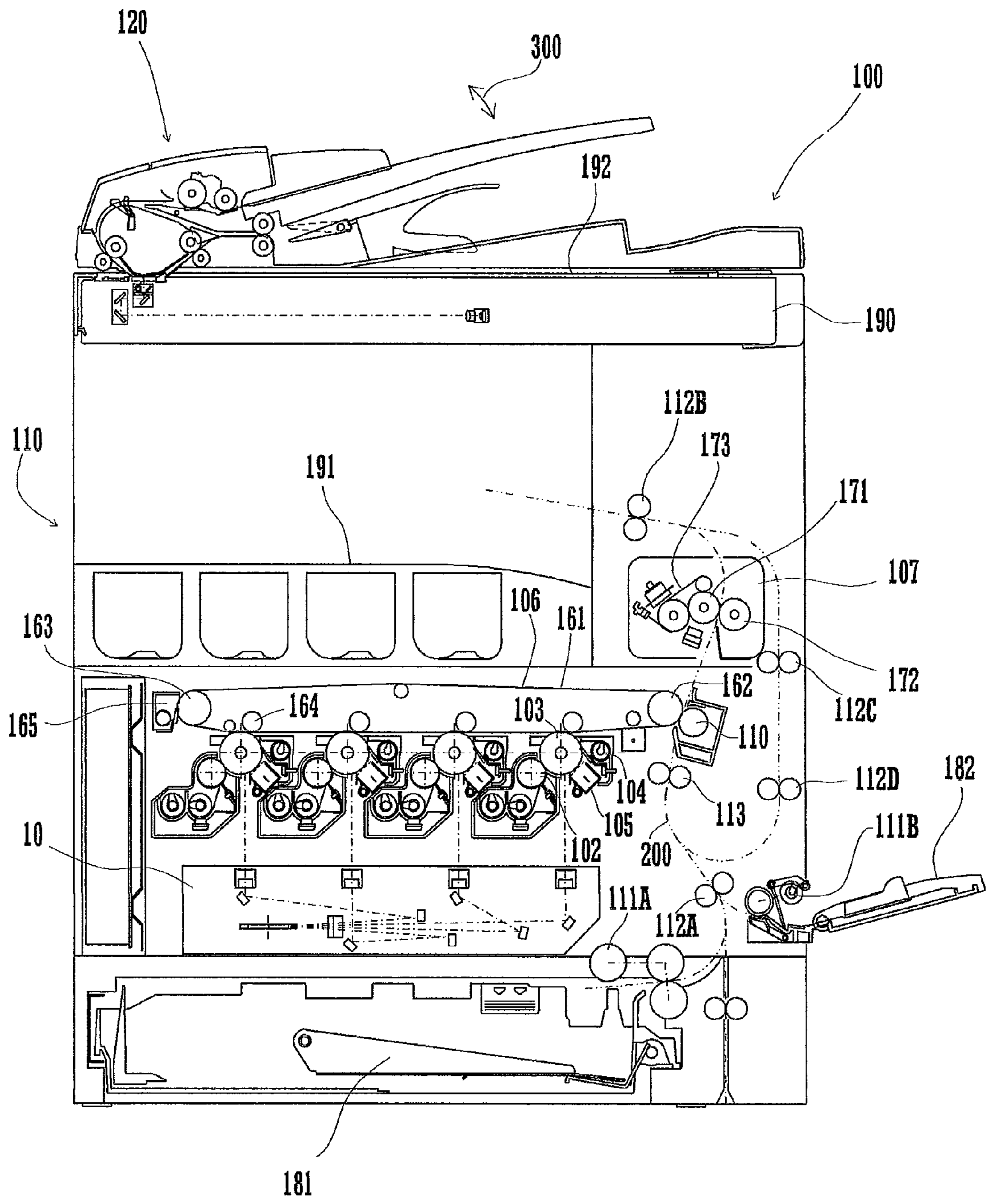
FIG. 1 is a schematic view of an image forming apparatus embodying the present invention.

FIG. 1 schematically shows an image forming apparatus 100 according to an embodiment of the present invention. In this embodiment, an optical box is applied to the optical scanner of an apparatus for electrophotographic image formation. However, an optical box according to the present invention may be applied to other apparatus than optical scanners.

The image forming apparatus 100 forms a multicolor or monochromatic image on a sheet of recording paper in accordance with supplied image data on color images, which are black (K), cyan (C), magenta (M), and yellow (Y).

The image forming apparatus 100 consists of a main body 110 and an automatic document processor 120. The main body 110 includes an optical scanner 10, four image stations, an intermediate transfer belt unit 106, a fixing unit 107, a feed cassette 181, and a delivery tray 191.

The main body 110 is fitted with a document platform 192 of transparent glass on its top. A document can be placed on the platform 192. The automatic document processor 120 is mounted on the main body 110 over the platform 192. The processor 120 feeds a document automatically onto the platform 192. The processor 120 can pivot in directions 300. By turning the processor 120 counterclockwise in FIG. 1, it is possible to place a document manually on the platform 192.

The image stations are black, cyan, magenta and yellow image stations, which form black, cyan, magenta and yellow latent images respectively. Each of the image stations includes a developing unit 102, a photosensitive drum 103, a cleaner unit 104, and a charging unit 105.

The charging unit 105 charges the cylindrical surface of the photosensitive drum 103 uniformly to a preset electric potential. The charging unit 105 is a non-contact type charger but might be a contact type charger such as a roller type or brush type charger.

The optical scanner 10 forms electrostatic latent images on the cylindrical surfaces of the photosensitive drums 103 of the four image stations in accordance with the image data input to the scanner 10. The scanner 10 will be described later on in detail.

The developing unit 102 develops the latent image on the associated drum 103 into a toner image with a toner of the associated color (Y, M, C, or K).

The cleaner unit 104 removes and recovers the toner remaining on the cylindrical surface of the associated drum 103 after the image on the drum is developed and transferred.

The intermediate transfer belt unit 106 is fitted over the photosensitive drums 103 and includes an intermediate transfer belt 161, a driving roller 162, a driven roller 163, four intermediate transfer rollers 164, and a cleaning unit 165. Each intermediate transfer roller 164 is provided for one of the image stations.

The intermediate transfer belt 161 runs over the rollers 162-164. A transfer bias is applied to the intermediate transfer rollers 164 so as to transfer the toner image on the photosensitive drums 103 to the intermediate transfer belt 161. The transfer bias is a high voltage (having a polarity (+) reverse to the polarity (−) in which the toner is charged).

Each intermediate transfer roller 164 is supported close to the associated drum 103 and biased toward it into compressive contact with the inner side of the intermediate transfer belt 161, the outer side of which is in compressive contact with the cylindrical surfaces of the drums 103.

The intermediate transfer rollers 164 transfer the toner images of the four colors on the drums 103 sequentially one over another to the belt 161 so as to form a multicolor toner image on the belt. The belt 161 is endless and includes a film, which may have a thickness of 100-150 μm.

Each intermediate transfer roller 164 includes a metal shaft, which is surrounded by an electrically conductive elastic material. The metal shaft may be made of stainless steel and have a diameter of 8-10 mm. The conductive elastic material may be EPDM or urethane foam and makes it possible to apply the high voltage uniformly to the intermediate transfer belt 161. The intermediate transfer rollers 164 are transfer electrodes, which might be brushes.

A transfer roller 110 is supported outside the intermediate transfer belt 161 close to the driving roller 162 and biased toward this roller into compressive contact with the outer side of the belt 161.

As stated already, the developing units 102 of the four image stations develop the electrostatic images on the photosensitive drums 103 into toner images of the four colors. The toner images are then superimposed as a multicolor toner image on the intermediate transfer belt 161.

As the intermediate transfer belt 161 runs, the transfer roller 110 transfers the multicolor toner image on the belt 161 to a sheet of recording paper passing through the nip between the belt 161 and roller 110. In order to make the nip constant, one of the transfer roller 110 and driving roller 162 is made of hard material such as metal, and the other is made of elastic or soft material such as elastic rubber or foamable resin.

A high voltage (having a polarity (+) reverse to the polarity (−) in which the toner is charged) is applied to the transfer roller 110 so as to transfer toner to a sheet of recording paper.

The cleaning unit 165 removes and recovers the toner sticking to the intermediate transfer belt 161, which is in contact with the photosensitive drums 103, or the toner remaining on the belt 161 if the transfer roller 110 does not transfer the toner image on the belt 161 to a sheet of recording paper. Otherwise, the sticking or remaining toner might cause toner color mixture at the next step.

The cleaning unit 165 is fitted outside the intermediate transfer belt 161 close to the driven roller 165. The cleaning unit 165 includes a cleaning blade or another cleaning member, which is biased toward the driven roller 165 into compressive contact with the outer side of the belt 161.

The feed cassette 181 is fitted under the optical scanner 10 and holds sheets of recording paper for image formation. The main body 110 is fitted with a hand-feed cassette 182, which can hold sheets of recording paper for image formation. The delivery tray 191 is provided at an upper portion of the main body 110 and holds printed sheets facedown.

The main body 110 has a substantially vertical paper path 200 formed in it, along which a sheet of recording paper passes from the feed cassette 181 or hand-feed cassette 182 via the transfer roller 110 and fixing unit 107 to the delivery tray 191. The path 200 leads from the cassettes 181 and 182 to the tray 191. Pickup rollers 111A and 111B, pairs of conveying rollers 112A-112D, a pair of registering rollers 113, the transfer roller 110, the fixing unit 107, etc. are arranged near the path 200.

The pickup roller 111A is supported near the front end of the feed cassette 181, picks up sheets of recording paper one after another from this cassette, and then feeds them to the paper path 200. Likewise, the pickup roller 111B is supported near the front end of the hand-feed cassette 182, picks up sheets of recording paper one after another from this cassette, and then feeds them to the path 200.

The conveying rollers 112A-112D are supported along the paper path 200. These rollers 112A-112D are small rollers for facilitating and assisting the conveyance of sheets of recording paper.

The registering rollers 113 temporarily hold a sheet passing along the paper path 200. Then, the registering rollers 113 feed the sheet to the nip between the transfer roller 110 and intermediate transfer belt 161 at such a time that the leading end of the sheet is registered with the leading end of the toner image on the belt 161.

The fixing unit 107 includes a heating roller 171, a pressing roller 172, and an external heating belt 173. These rollers 171 and 172 rotate with a sheet of recording paper passing through the nip between them. The control unit (not shown) of the image forming apparatus 100 keeps the temperature of the heating roller 171 at a preset fixing temperature based on the signal from the temperature sensor (not shown) of the apparatus. The heating roller 171 cooperates with the pressing roller 172 to melt, mix, and press the transferred multi-color toner image on a sheet of recording paper by bonding the toner of the image thermo-compressively to the sheet. This fixes the toner image thermally on the sheet. The heating belt 173 heats the heating roller 171 from the outside of this roller.

As stated already, the image forming apparatus 100 is fitted with a feed cassette 181 and a hand-feed cassette 182, which hold sheets of recording paper in advance. Each of the pickup rollers 111A and 111B feeds sheets one after another from the associated cassette 181 or 182 to the path 200.

In accordance with a one-side print request, a sheet of recording paper is fed from the feed cassette 181 or hand-feed cassette 182. The conveying rollers 112A convey the sheet along the paper path 200 to the nip between the registering rollers 113. The registering rollers 113 feed the sheet to the nip between the transfer roller 110 and intermediate transfer belt 161 at such a time that the leading end of the sheet is registered with the leading end of the image on the belt 161. The transfer roller 110 transfers the image to one side of the sheet. Subsequently, the sheet passes through the fixing unit 107, where the unfixed toner on the sheet melts and is fixed with heat. Then, the conveying rollers 112B deliver the sheet to the delivery tray 191.

In accordance with a double-side print request, the transfer roller 110 transfers an image likewise to one side of a sheet, which then passes through the fixing unit 107. When the trailing end of the sheet reaches the nip between the last conveying rollers 112B, these rollers start to rotate reversely to direct the sheet to the conveying rollers 112C and 112D. Then, after the sheet passes again through the nip between the registering rollers 113, the transfer roller 110 transfers another image to the other side of the sheet. Subsequently, the sheet is delivered to the delivery tray 191.

Figure 2A:
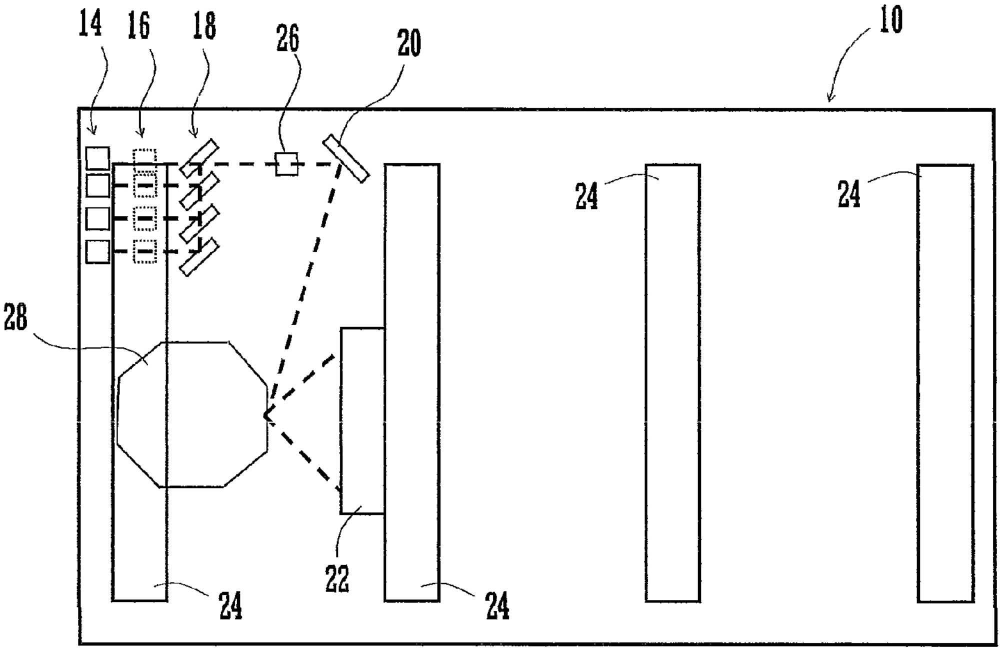
FIGS. 2A and 2B are schematic diagrams of the optical scanner of the image forming apparatus.
Figure 2B:
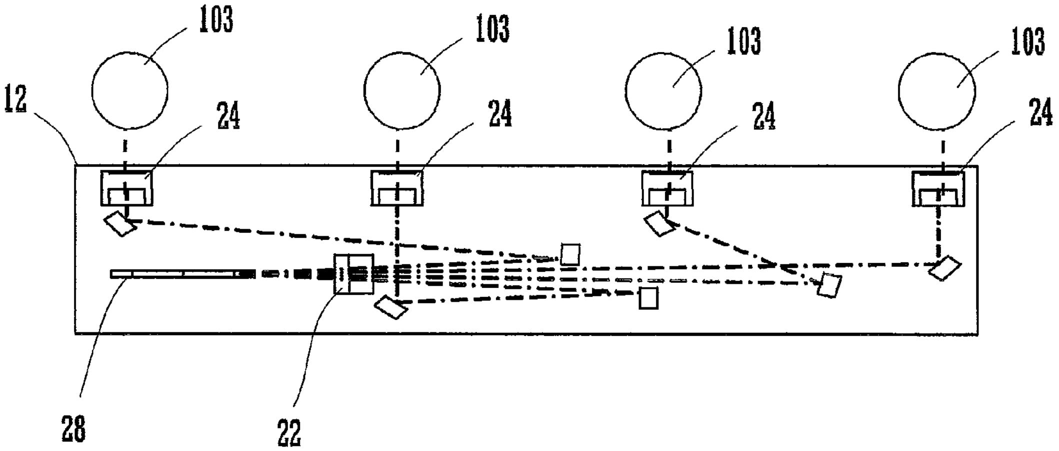

With reference to FIGS. 2A and 2B, the optical scanner 10 exposes the charged surfaces of the photosensitive drums 103 to light in accordance with the image data input to the scanner 10. The exposure forms electrostatic latent images on the drum surfaces in accordance with the image data.

The optical scanner 10 includes an optical box, which includes an optical housing 12. The scanner 10 further includes four semiconductor lasers 14, four collimator lenses 16, four mirrors 18, a cylindrical lens 26, a mirror 20, a polygon mirror 28, an fθ lens 22, and four fθ lenses 24. The lasers 14 are fitted at specified positions in the housing 12.

The semiconductor lasers 14 emit light beams. The collimator lenses 16 parallelize the four beams directed from the lasers 14 to the polygon mirror 28. The mirrors 18 direct the four beams from the collimator lenses 16 to the cylindrical lens 26. The mirror 20 directs the four beams from the cylindrical lens 26 to the polygon mirror 28.

The polygon mirror 28 is supported rotatably on a shaft (not shown) and reflects the beams emitted from the semiconductor lasers 14. The fθ lenses 22 and 24 cooperate with turning mirrors etc. to direct the beams from the polygon mirror 28 to the cylindrical surfaces of the photosensitive drums 103, and to scan the drum surfaces with beam spots of a specified size at an equal speed.

Figure 4A:
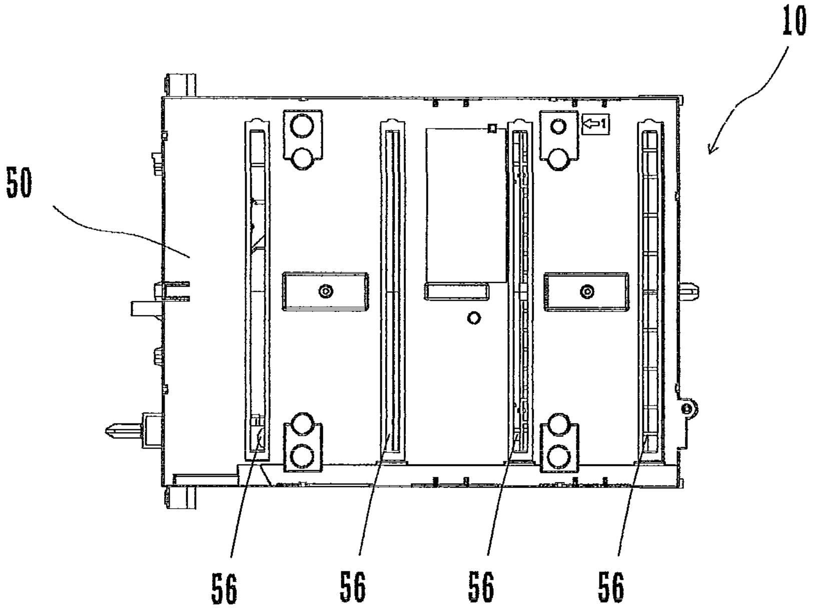
FIGS. 4A-4C are top, end and side views respectively of the optical box, showing the optical housing engaging with the lid of the box.
Figure 4B:
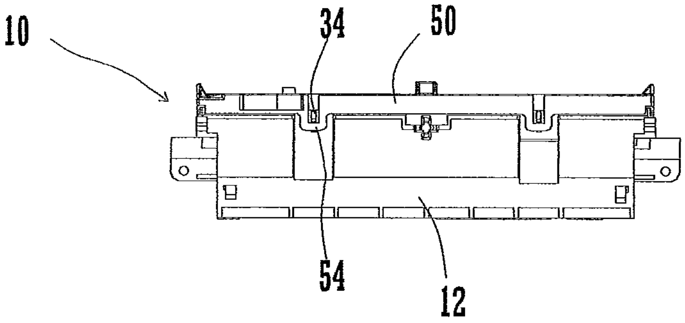
Figure 4C:
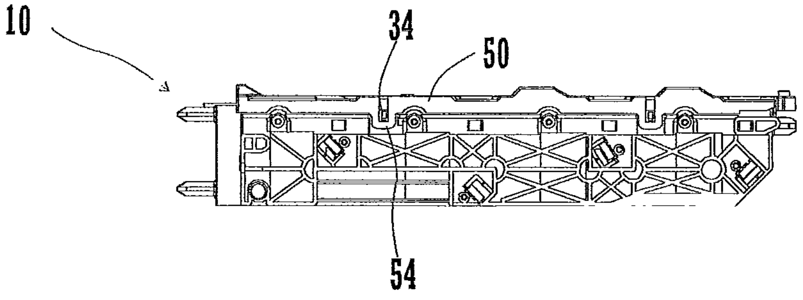

With reference to FIGS. 4A-4C, the top of the optical housing 12 is open and covered with a lid 50. The lid 50 has four translucent windows 56, through which the optical scanner 10 emits light beams.

The optical box of the optical scanner 10 holds optical parts in it and is fitted removably in the image forming apparatus 100. The optical box is molded out of ABS resin but might be molded out of other resin.

Figure 3A:
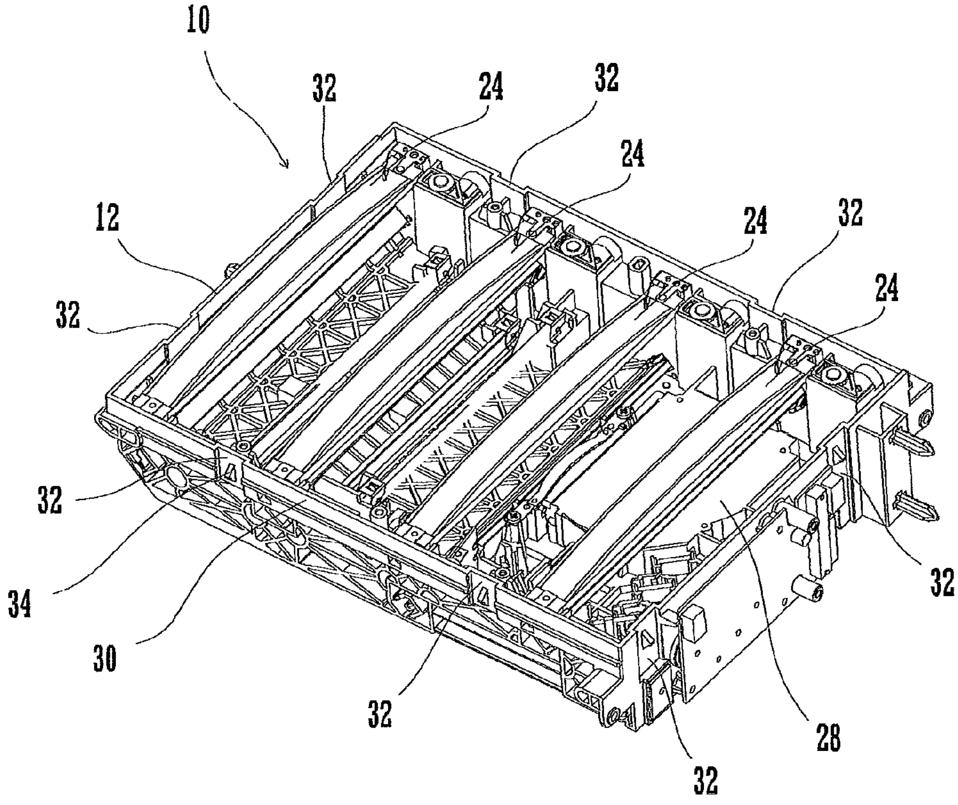
FIGS. 3A and 3B are perspective views of the optical housing of the optical box of the optical scanner.
Figure 3B:
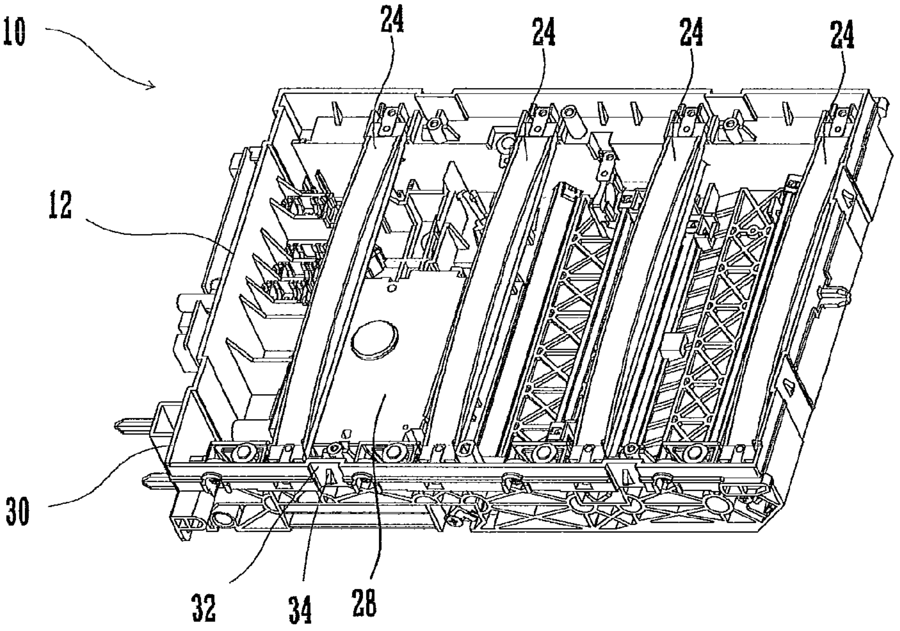
Figure 6A:
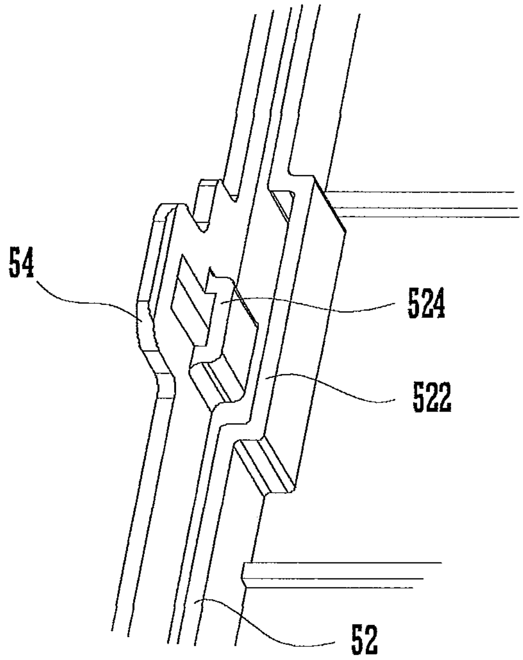
FIG. 6A is a partial perspective view of the lid, showing a claw of the lid.
Figure 6B:
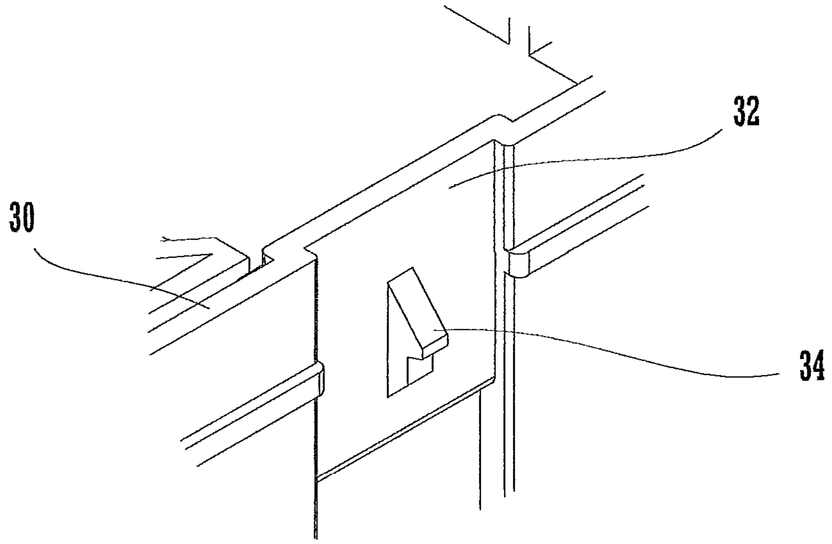
FIG. 6B is a partial perspective view of the optical housing, showing a protrusion of the housing.

With reference to FIGS. 3A, 3B and 6B, the optical housing 12 includes four walls 30 surrounding its top. The housing walls 30 include inward recessed parts 32, each of which has an outward protrusion 34 formed on its bottom.

Figure 5A:
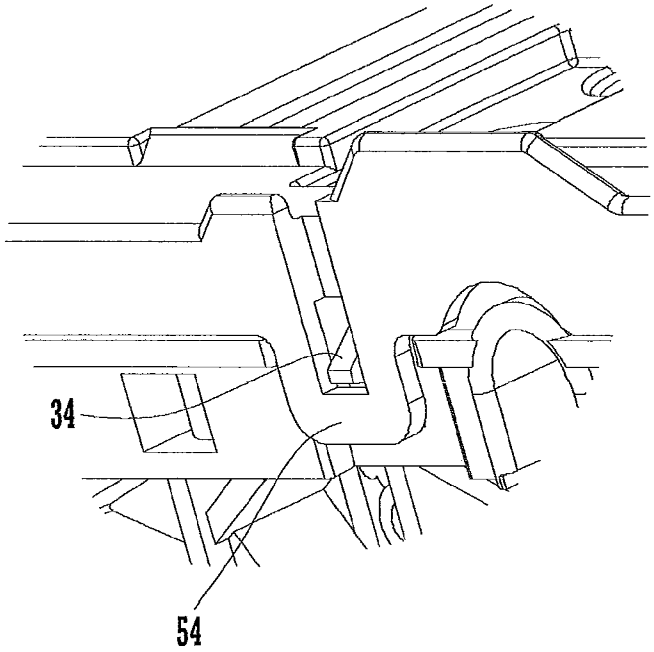
FIGS. 5A and 5B are partial perspective and partial sectional views respectively of the optical box, showing the optical housing engaging with the lid.
Figure 5B:
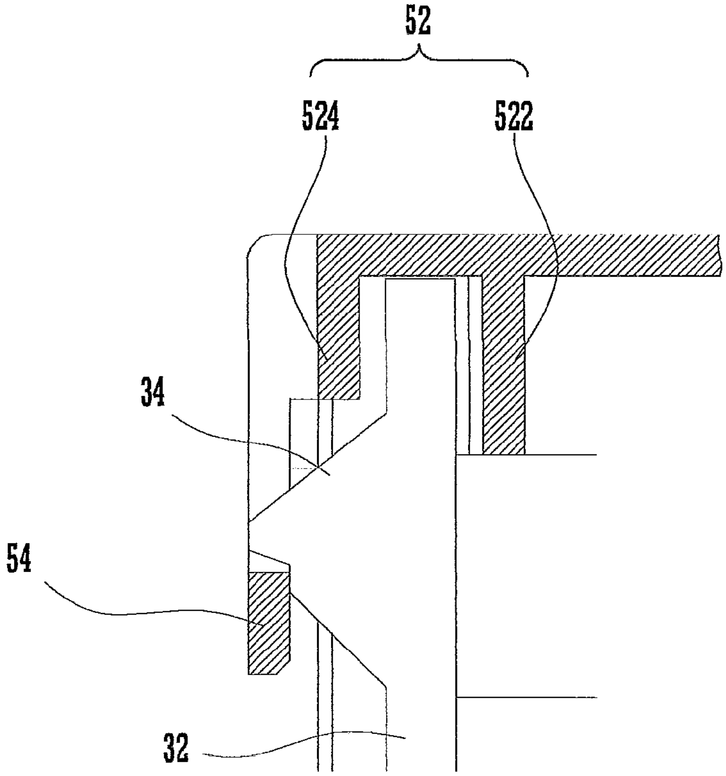

With reference to FIGS. 5B and 6A, the lid 50 has four pairs of inner and outer dust guard walls 52. The whole of each housing wall 30 can be sandwiched between the inner and outer dust guard walls 52 as one pair. The inner and outer dust guard walls 52 include pairs of inward recessed parts 522 and 524 respectively. Each pair of inward recessed parts 522 and 524 engages with one of the inward recessed parts 32 of the optical housing 12.

With reference to FIGS. 5A, 5B and 6A, the outer dust guard walls 52 have downward claws 54 each formed below one of the inward recessed parts 524. Each claw 54 has a hole formed through it, which engages with the adjacent housing protrusion 34 so as to fix the lid 50 to the optical housing 12.

Thus, the dust guard walls 52 of the lid 50 continue without breaking off near the claws 54. Accordingly, these walls 52 securely cover the whole walls 30 of the optical housing 12, so that no dust is liable to enter the optical box through the gaps between the housing 12 and lid 50, particularly near the claws 54.

A space can be formed between each inward recessed part 524 and the adjacent claw 54, so that the claws 54 are easy to form by means of a simple vertical cutting die. In particular, because the claws 54 do not need to extend outward for molding convenience, they are not liable to protrude outward from the optical housing 12.

It is preferable that the lid claws 54 should not protrude outward from the housing walls 30 when the lid 50 is in engagement with the optical housing 12. If the claws 54 do not protrude from the walls 30, the claws 54 are less liable to come into contact with other parts of the image forming apparatus 100 when the optical scanner 10 is mounted in and removed from the apparatus 100. This makes the scanner 10 easier to mount in and remove from the apparatus 100. In addition, this prevents the claws 54 from being broken by external force.

It is also preferable that the outer sides of the lid claws 54 be flush with the outer surfaces of the housing walls 30 when the lid 50 is in engagement with the optical housing 12. If the outer sides of the claws 54 are flush with the outer surfaces of the walls 30, the claws 54 are less liable to catch members in the image forming apparatus 100 when the optical scanner 10 is mounted in and removed from the apparatus 100.

The four light beams to which the photosensitive drums 103 can be exposed pass through the translucent windows 56 of the lid 50. As a result, heat is liable to be generated in the optical box and near the lid 50. However, because the lid 50 is not screwed firmly to the optical housing 12, the whole box can absorb thermal strain.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical box as a plastic molding for holding an optical part therein, the box being mountable in an image forming apparatus and removable from the apparatus, the box comprising:

a first housing member having an opening at one side and a second housing member capable of so engaging with the first housing member as to cover the opening of the first housing member;

wherein the first housing member includes a side wall surrounding the opening, the side wall including a plurality of first inward recessed parts, wherein the second housing member includes a pair of dust guard walls, the dust guard walls being so formed that the whole side wall of the first housing member is sandwiched therebetween when the second housing member is in engagement with the first housing member, wherein the side wall includes first engaging parts each formed on an outer side of one of the inward recessed parts, the first engaging parts being engageable with the second housing member, wherein the dust guard walls include pairs of second inward recessed parts respectively, and each pair of second inward recessed parts of the dust guard walls engages with one of the first inward recessed parts of the first housing member, wherein the dust guard walls include adjacent claws each formed outside one of the second recessed parts configured so as to correspond to the first inward recessed parts of the side wall of the first housing member, the adjacent claws each being engageable with an associated first engaging part, wherein a space is formed between each of the second inward recessed parts of the dust guard walls and an adjacent claw, wherein the adjacent claws do not protrude outward from the side wall of the first housing member when the two housing members are in engagement with each other, wherein the outer sides of the adjacent claws are flush with the outer surface of the side wall of the first housing member when the two housing members are in engagement with each other, and wherein each of the first engaging parts is a protrusion protruding outward from the associated first inward recessed part, and wherein each of the adjacent claws is a claw having a hole formed therethrough for engaging with the associated protrusion.

2. An optical box as claimed in claim 1, wherein the first housing member is an optical housing for holding the optical part therein, and wherein the second housing member is a lid for covering the housing, the lid including a translucent part, the optical part being adapted to emit light through the translucent part.

3. An optical scanner comprising an optical box as claimed in claim 2, the scanner being adapted to expose an image carrier to the emitted light through the translucent part of the lid.

4. An image forming apparatus comprising an optical scanner as claimed in claim 3.

* * * * *